United States Patent
Miura et al.

(10) Patent No.: US 10,908,707 B2
(45) Date of Patent: Feb. 2, 2021

(54) POSITION DETECTING SENSOR, POSITION DETECTING DEVICE, AND INFORMATION PROCESSING SYSTEM

(71) Applicant: Wacom Co., Ltd., Saitama (JP)

(72) Inventors: Yoichi Miura, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/679,083

(22) Filed: Nov. 8, 2019

(65) Prior Publication Data

US 2020/0142541 A1 May 7, 2020

Related U.S. Application Data

(63) Continuation of application No. PCT/JP2018/017870, filed on May 9, 2018.

(30) Foreign Application Priority Data

Jul. 27, 2017 (JP) .................................. 2017-145131

(51) Int. Cl.
*G06F 3/0354* (2013.01)
*G06F 3/044* (2006.01)
(Continued)

(52) U.S. Cl.
CPC ........ *G06F 3/03545* (2013.01); *G06F 3/0321* (2013.01); *G06F 3/0416* (2013.01);
(Continued)

(58) Field of Classification Search
CPC .... G06F 3/0321; G06F 3/03545; G06F 3/041; G06F 3/044; G06F 3/0446; G06F 3/0448
(Continued)

(56) References Cited

U.S. PATENT DOCUMENTS

2014/0333555 A1* 11/2014 Oh .......................... G06F 3/044
345/173
2015/0109231 A1 4/2015 Shirai et al.
(Continued)

FOREIGN PATENT DOCUMENTS

JP 2010-86684 A 4/2010
JP 2012-108844 A 6/2012
(Continued)

OTHER PUBLICATIONS

International Search Report, dated Jul. 24, 2018, for International Application No. PCT/JP2018/017870, 2 pages.

*Primary Examiner* — Mark Edwards (74) *Attorney, Agent, or Firm* — Seed IP Law Group LLP (57) ABSTRACT

A position detecting sensor includes a plurality of first electrodes arranged in a first direction; and a plurality of second electrodes arranged in a second direction intersecting the first direction. The plurality of first electrodes and the plurality of second electrodes are formed in a mesh form. One or both of: (i) a width of each of the plurality of first electrodes in an arrangement direction of the plurality of first electrodes is different from a width of each of the plurality of second electrodes in an arrangement direction of the plurality of second electrodes, and (ii) a mesh density of each of the plurality of first electrodes is different from a mesh density of each of the plurality of second electrodes.

18 Claims, 8 Drawing Sheets

(51) Int. Cl.
  *G06F 3/03*       (2006.01)
  *G06F 3/041*      (2006.01)
(52) U.S. Cl.
  CPC .......... *G06F 3/0442* (2019.05); *G06F 3/0445* (2019.05); *G06F 3/0446* (2019.05); *G06F 3/0448* (2019.05)
(58) Field of Classification Search
  USPC ......................................................... 345/179
  See application file for complete search history.

(56) References Cited

U.S. PATENT DOCUMENTS

| | | | |
|---|---|---|---|
| 2016/0266673 A1* | 9/2016 | Dinu | G06F 3/044 |
| 2016/0274703 A1* | 9/2016 | Satou | G06F 3/044 |
| 2017/0177145 A1 | 6/2017 | Hara et al. | |

FOREIGN PATENT DOCUMENTS

| | | |
|---|---|---|
| JP | 2014-29671 A | 2/2014 |
| JP | 2014-219986 A | 11/2014 |
| JP | 2017-111687 A | 6/2017 |

* cited by examiner

FIG.4C $Xw < Yw \cdots (1)$

FIG. 6C $$XAw = YAw \cdots (1)$$

POSITION DETECTING SENSOR, POSITION DETECTING DEVICE, AND INFORMATION PROCESSING SYSTEM

BACKGROUND

Technical Field

The present disclosure relates to a position detecting sensor capable of receiving an indication input by a stylus (electronic pen), and a position detecting device and an information processing system that use the position detecting sensor.

Background Art

Various electronic apparatuses equipped with a touch panel have come into wide use. The touch panel is a device that is constituted of a display device such as a liquid crystal display (LCD) or the like and a touch sensor, and implements a display function and an input function. The touch sensor is to detect a position indicated by an indicator such as a finger of a user, a passive pen, or the like. The touch sensor is generally disposed on the display screen of the display device.

Therefore, the touch sensor is formed as a transparent touch sensor so as not to render information displayed on the display screen of the display device difficult to see. Japanese Patent Laid-open No. 2010-086684, which will be described later as a concrete example of the touch sensor, discloses a touch sensor configured by arranging electrodes formed using indium tin oxide (ITO) in a lattice manner. In addition, Japanese Patent Laid-open No. 2012-108844 to be described later discloses a touch sensor configured by using so-called mesh electrodes formed such that metallic thin wires having a smaller resistance value than ITO are woven in a mesh form.

Figure 9A:
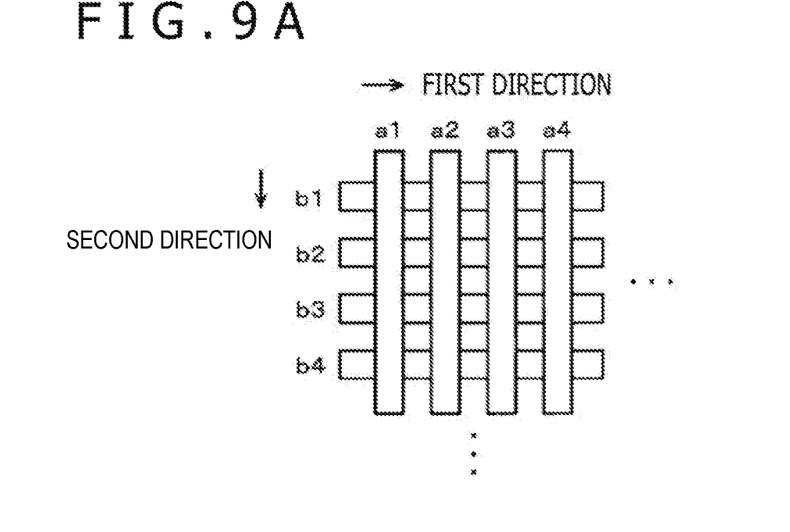
FIGS. 9A, 9B, and 9C are diagrams of assistance in explaining a general configuration of a position detecting sensor and principles of position detection.

As depicted in FIG. 9A, for example, a general configuration of a position detecting sensor such as a touch sensor or the like is a configuration obtained by laminating a first electrode group formed by arranging a plurality of first electrodes a1, a2, . . . in a first direction and a second electrode group formed by arranging a plurality of second electrodes b1, b2 . . . in a second direction intersecting the first direction, with an insulating layer disposed between the first electrode group and the second electrode group. In the position detecting sensor depicted in FIG. 9A, a side on which the first electrode group is disposed is an upper side (operating surface side), and a side on which the second electrode group is disposed is a lower side.

In a case where the input of an indicated position is desired to be performed more minutely through such a position detecting sensor, a stylus (electronic pen) that sends out a signal for detection of the indicated position may be used. In this case, the stylus and an electrode with which the stylus comes into proximity are electrostatically coupled to each other, a voltage is induced in the electrode, and thus a signal appears in the electrode. Therefore, by sequentially changing the first electrodes and the second electrodes and detecting an electrode in which a signal appears, it is possible to detect that the intersection point of a first electrode and a second electrode in which the signal appears is a position indicated by the stylus.

Figure 9B:
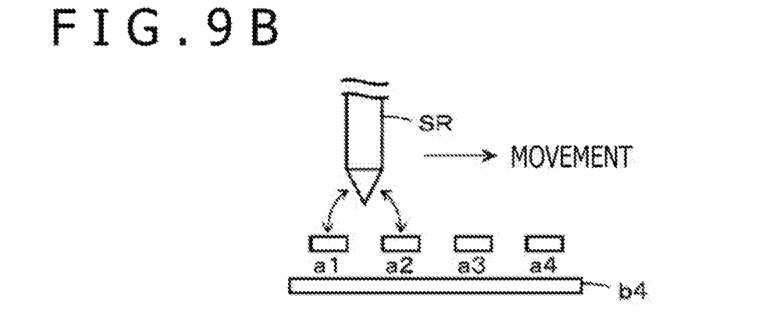
Figure 9C:
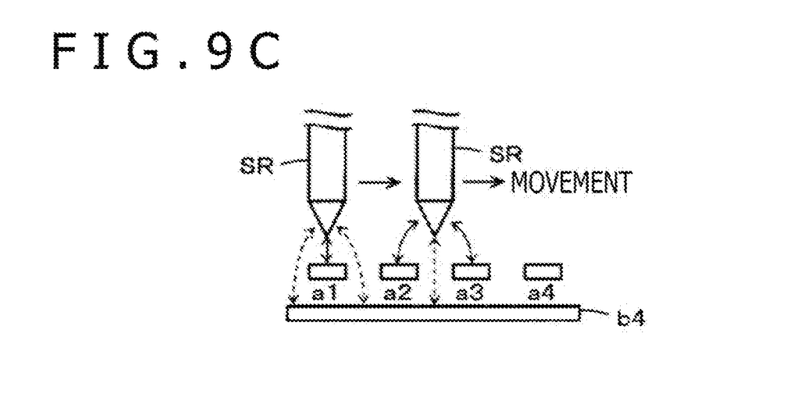

As depicted in FIG. 9B, the first electrodes a1, a2, . . . are located on the operating surface side. Thus, a stylus SR and each of the first electrodes a1, a2, . . . are electrostatically coupled to each other excellently at a short distance, and a coupling capacitance therebetween is high, as indicated by solid line arrows. However, as depicted in FIG. 9C, the second electrodes b1, b2, . . . are located on the lower side of the first electrodes a1, a2, Therefore, the stylus SR and the second electrodes b1, b2, . . . are electrostatically coupled to each other through interstices between the first electrodes as shielding objects, as indicated by dotted line arrows. It is thus considered that coupling capacitances between the stylus SR and the second electrodes b1, b2, . . . may be low.

Thus, in a case where a sufficient coupling capacitance is not obtained, there is a possibility of a result of detection of an indicated position deviating from an actual indicated position. That is, there is a possibility of a degradation in linearity of the result of detection of the indicated position. The width of each electrode may be widened in order to improve detection accuracy by increasing the coupling capacitance between the stylus SR and each electrode. However, when the width of the first electrodes is widened, the first electrodes obstruct the electrostatic coupling between the stylus and the second electrodes to a greater extent, and the linearity of the result of detection of the indicated position cannot be maintained.

In recent years, position detecting sensors have come into use which use metallic mesh electrodes combining excellent conductivity with a low resistance and excellent transparency with a low reflectance. There is a desire to detect an indicated position with good linearity also in such position detecting sensors using metallic mesh electrodes.

BRIEF SUMMARY

In view of the above, in relation to position detecting sensors using metallic mesh electrodes, it is an object to more improve the linearity of accuracy of detection of a position indicated (coordinates indicated) by a stylus, and thereby enable minute indication input to be performed more properly (excellently).

In order to solve the above problems, there is provided a position detecting sensor including: a plurality of first electrodes arranged in a first direction; and a plurality of second electrodes arranged in a second direction intersecting the first direction, in which the plurality of first electrodes and the plurality of second electrodes are formed in a mesh form, and one or both of: (i) a width of each of the plurality of first electrodes is different from a width of each of the plurality of second electrodes in an arrangement direction of the plurality of second electrodes, and (ii) a mesh density of each of the plurality of first electrodes is different from a mesh density of each of the plurality of second electrodes.

According to this position detecting sensor, the position detecting sensor is formed by vertically laminating the plurality of first electrodes arranged in the first direction and the plurality of second electrodes arranged in the second direction intersecting the first direction. While the plurality of first electrodes and the plurality of second electrodes are formed in a mesh form, the plurality of first electrodes are different from the plurality of second electrodes in one or both of width in the arrangement direction and mesh density.

That is, the first and second electrodes are formed such that a net is woven by using metallic thin wires, and are thus in a mesh form (reticulate form) in which a large number of meshes (interstices) are provided. Making the first electrodes different from the second electrodes in one or both of width in the arrangement direction and mesh density enables sufficient coupling capacitances to be secured between the electrodes located on a back side as viewed from an operating surface side with which the stylus (electronic pen)

comes into contact and the stylus. Further, the characteristics of the coupling capacitances are made as flat as possible. It is thereby possible to improve detection accuracy of stylus detection (for indication input by the stylus).

Incidentally, the mesh density refers to a degree of density of meshes (network). Hence, when the mesh pitch (intervals between metallic thin wires) is long and the meshes (interstices) are large, the mesh density can be said to be sparse (low). Conversely, when the mesh pitch (intervals between metallic thin wires) is short and the meshes (interstices) are small, the mesh density can be said to be dense (high).

DETAILED DESCRIPTION OF THE PREFERRED EMBODIMENTS

First Embodiment

[Outline of Transparent Sensor and Position Detecting Device]

Figure 1:
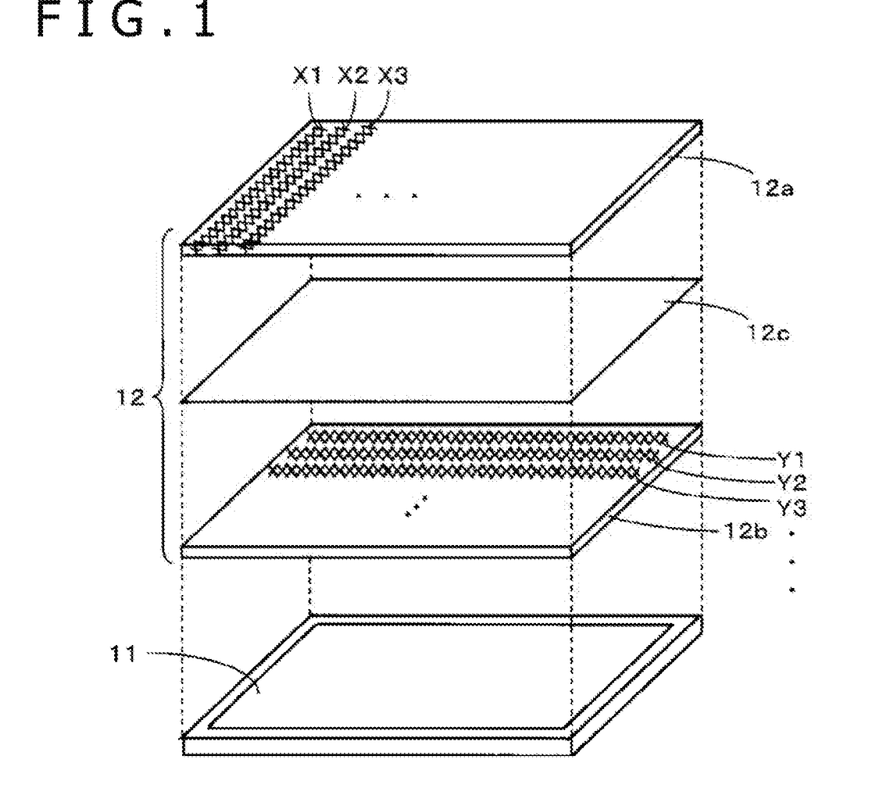
FIG. 1 is a diagram depicting an example of a configuration of a position detecting sensor according to an embodiment of the present disclosure.

FIG. 1 is a diagram of assistance in explaining a position detecting sensor according to an embodiment of the present disclosure. As depicted in FIG. 1, a transparent sensor 12 having electrodes (mesh electrodes) formed in a mesh form by metallic thin wires is provided on an LCD panel 11. One embodiment of the position detecting sensor according to the present disclosure is applied to the transparent sensor 12. Incidentally, the metallic thin wires constituting the mesh electrodes are formed of copper, silver, or another metal having a low resistance value.

The transparent sensor 12 according to the present embodiment is configured as follows. As indicated by mesh electrodes Y1, Y2, Y3, . . . in FIG. 1, a Y-direction mesh electrode group made by arranging a plurality of mesh electrode lines in a Y-direction (longitudinal direction in FIG. 1) is formed on an insulating layer 12b. Similarly, as indicated by mesh electrodes X1, X2, X3, . . . in FIG. 1, an X-direction mesh electrode group made by arranging a plurality of mesh electrode lines in an X-direction (lateral direction in FIG. 1) orthogonal to the Y-direction is formed on an insulating layer 12a. Then, the transparent sensor 12 is formed by bonding each of a surface of the insulating layer 12b on which surface the Y-direction mesh electrode group is formed and a surface of the insulating layer 12a on which surface the X-direction mesh electrode group is formed to an insulating layer 12c such that the surface of the insulating layer 12b and the surface of the insulating layer 12a face each other with the insulating layer 12c interposed therebetween.

Incidentally, each of the insulating layers 12a, 12b, and 12c is formed in a plate shape or a film shape by a variety of transparent insulating materials such, for example, as glass, acrylic resin, polyethylene terephthalate (PET), and the like. For example, the insulating layers 12a and 12b on which the mesh electrodes are formed can be formed of glass, and the insulating layer 12c can be formed of a PET film.

Figure 2:
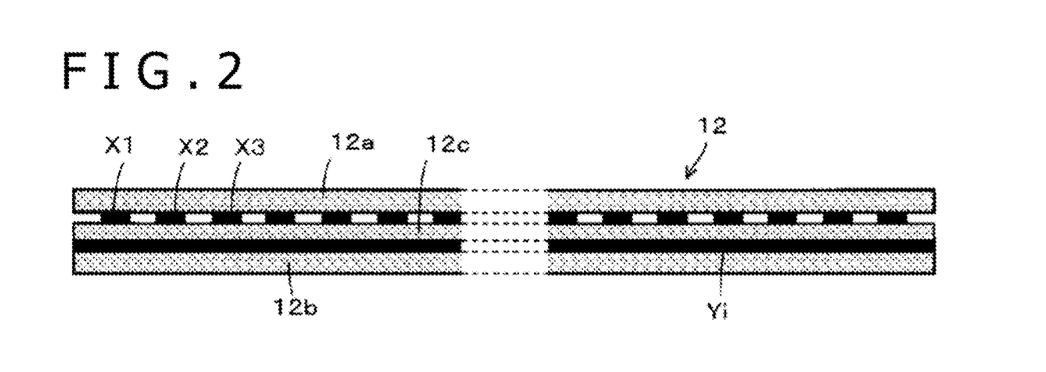
FIG. 2 is a sectional view of the position detecting sensor in the example of FIG. 1.

As depicted in FIG. 1, the transparent sensor 12 is disposed so as to be superposed on the LCD panel 11 such that a position detecting region of the transparent sensor 12 is precisely superposed on a display region of the LCD panel 11. Incidentally, the electrodes arranged in the X-direction on the insulating layer 12a (hereinafter, referred to as X-electrodes) X1, X2, X3, . . . and the electrodes arranged in the Y-direction on the insulating layer 12b (hereinafter, referred to as Y-electrodes) Y1, Y2, Y3, . . . are, for example, connected to a printed circuit board not depicted via a flexible board not depicted by an anisotropic conductive film (ACF) connection. A position detecting circuit and the like are formed on the printed circuit board. FIG. 2 is a sectional view obtained by sectioning the transparent sensor 12 on a Y-electrode Yi.

Figure 3:
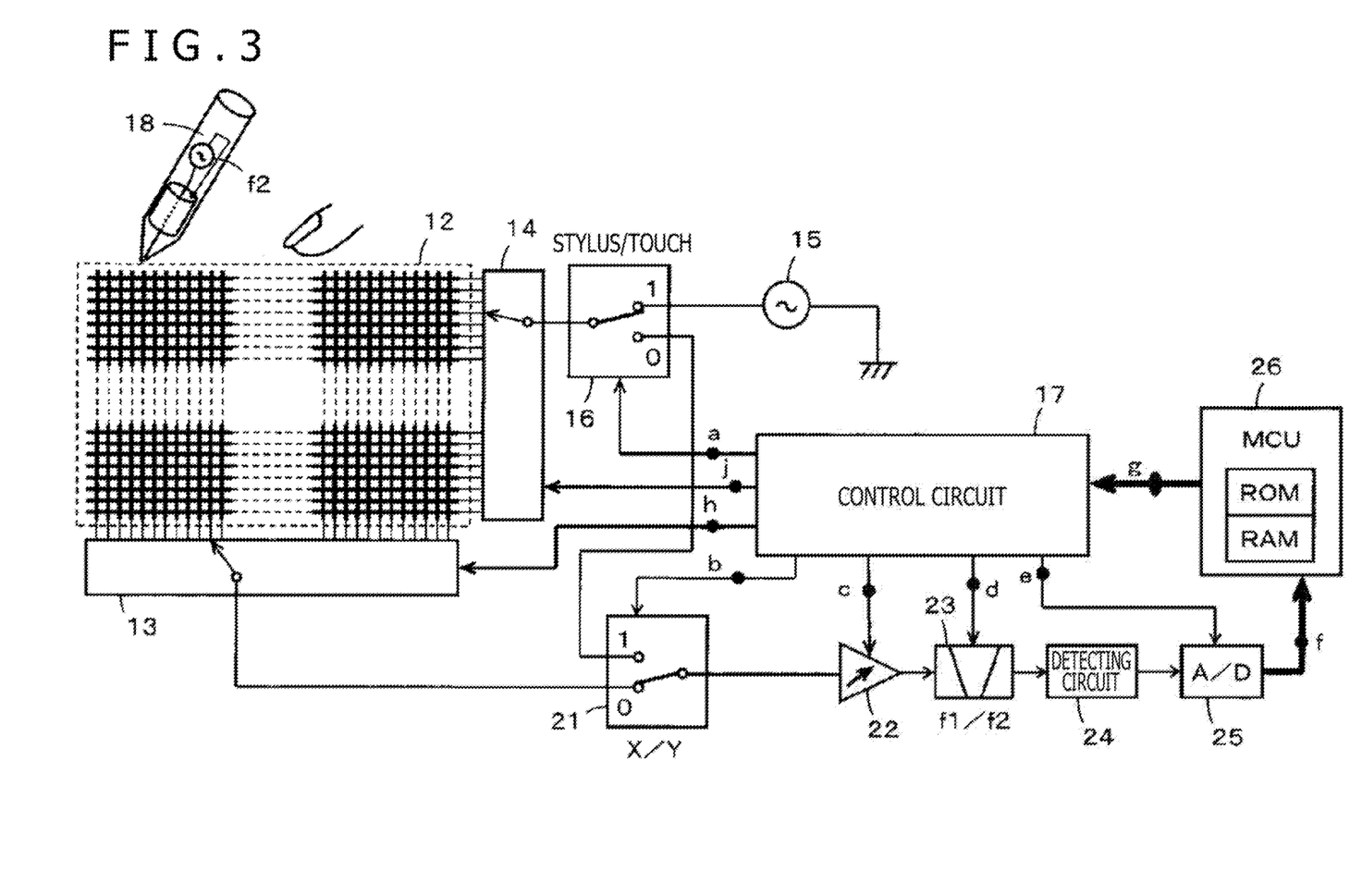
FIG. 3 is a diagram depicting an example of a configuration of a position detecting device according to an embodiment of the present disclosure.

FIG. 3 is a configuration diagram of a position detecting device according to of one embodiment the present disclosure which position detecting device is configured using the transparent sensor 12 according to the present embodiment. In FIG. 3, the reference numeral 12 denotes the transparent sensor, and the reference numeral 13 denotes an X-selecting circuit that is connected to the X-electrodes of the transparent sensor 12 and selects one X-electrode from among the X-electrodes X1, X2, X3, . . . . The reference numeral 14 denotes a Y-selecting circuit that is connected to the Y-electrodes of the transparent sensor 12 and selects one Y-electrode from among the Y-electrodes Y1, Y2, Y3, . . . . In the present embodiment, description will be made supposing that there are 40 X-electrodes (X1 to X40) and 30 Y-electrodes (Y1 to Y30).

The reference numeral 15 denotes an oscillator that oscillates at a frequency of f1. The reference numeral 16 denotes a switching circuit that switches connection of the Y-electrode selected by the Y-selecting circuit 14 to one of an output of the oscillator 15 and an input of a gain control circuit 22 to be described later.

Specifically, when the present device is made to operate for touch detection, a control circuit 17 sets a control signal a supplied to the switching circuit 16 to a high level "1," so that the switching circuit 16 selects the output side of the oscillator 15. In addition, when the present device is made to operate for stylus detection, the control circuit 17 sets the control signal a to a low level "0," so that the switching circuit 16 selects the input side of the gain control circuit 22. Thus, the transparent sensor 12 and the position detecting device according to the present embodiment are of an electrostatic coupling type, and are capable of both of touch detection and stylus detection.

Incidentally, in the present specification, touch detection refers to detection of a position (contact position) touched by an indicator such as a finger of a user or the like that does not send out a signal for position indication. In addition, stylus detection refers to detection of a position indicated by an electrostatic coupling type stylus (electronic pen) that sends out a signal for position indication.

The reference numeral 18 denotes a stylus, in which an output voltage from an oscillator having a frequency of f2 is supplied between an electrode of a tip portion and a peripheral electrode surrounding the electrode of the tip portion. That is, the stylus 18 is of an active electrostatic coupling type (AES type).

The reference numeral 21 denotes a switching circuit that selects either the X-electrode selected by the X-selecting circuit 13 or the Y-electrode selected by the Y-selecting circuit 14 via the switching circuit 16, and connects the electrode to the gain control circuit 22. Specifically, when the present device is made to operate for touch detection, the control circuit 17 sets a control signal b supplied to the switching circuit 21 to a low level "0," so that the switching circuit 21 selects the X-selecting circuit 13 side.

In addition, when the present device is made to operate for stylus detection, and the X-axis coordinate of a position indicated by the stylus 18 is to be obtained, the control circuit 17 sets the control signal b to a low level "0," so that the switching circuit 21 selects the X-selecting circuit 13 side. In addition, when a Y-axis coordinate of the position indicated by the stylus 18 is to be obtained, the control circuit 17 sets the control signal b to a high level "1," so that the switching circuit 21 selects the Y-selecting circuit 14 side. The gain control circuit 22 converts an output signal into a signal having an appropriate level according to a control signal c from the control circuit 17.

The reference numeral 23 denotes a band-pass filter circuit having a predetermined bandwidth centered at a frequency f1 or a frequency f2. The center frequency of the bandwidth of the band-pass filter circuit 23 is switched by a control signal d from the control circuit 17. When the present device is made to operate for touch detection, the center frequency is switched to f1. When the present device is made to operate for stylus detection, the center frequency is switched to f2.

An output signal of the band-pass filter circuit 23 is detected by a detecting circuit 24, and is thereafter supplied to an analog/digital (AD) converting circuit 25 to be converted into a digital value by the AD converting circuit 25 on the basis of a control signal e from the control circuit 17. Digital data f from the AD converting circuit 25 is read and processed by a microprocessor 26.

The control circuit 17 supplies a control signal h to the X-selecting circuit 13. The X-selecting circuit 13 thereby sequentially selects one X-electrode. In addition, the control circuit 17 supplies a control signal j to the Y-selecting circuit 14. The Y-selecting circuit 14 thereby sequentially selects one Y-electrode. The reference numeral 26 denotes a microprocessor (MCU: Micro Controller Unit). The microprocessor internally includes a read only memory (ROM) and a random access memory (RAM), and operates according to a program stored in the ROM. The microprocessor 26 controls the control circuit 17 by outputting a control signal g on the basis of the program so that the control circuit 17 outputs the control signals a to f, h, and j at a predetermined timing.

When the position detecting device depicted in FIG. 3 operates for touch detection, the Y-electrode selected in the Y-selecting circuit 14 is supplied with a signal of the frequency f1 from the oscillator 15. Then, the X-electrode selected by the X-selecting circuit 13 is connected to the gain control circuit via the switching circuit 21.

A signal induced by electrostatic coupling at an intersection point formed by one X-electrode selected by the X-selecting circuit 13 and one Y-electrode selected by the Y-selecting circuit 14 is subjected to gain adjustment by the gain control circuit 22. At this time, when a finger touches a vicinity of the intersection point of the selected X-electrode and the selected Y-electrode, an electric field from the Y-electrode in the vicinity of the intersection point is absorbed by the finger. Thus, a signal level induced in the X-electrode intersecting the Y-electrode is decreased. A touch position can be detected according to the position of the intersection point of the selected Y-electrode and the selected X-electrode in this case.

In addition, when the position detecting device depicted in FIG. 3 operates for stylus detection, for example, the X-electrode selected sequentially in the X-selecting circuit 13 is first connected to the gain control circuit 22 through the switching circuit 21. Next, the Y-electrode selected sequentially in the Y-selecting circuit 14 is connected to the gain control circuit 22 through the switching circuit 16 and the switching circuit 21.

At this time, in a case where a stylus is not in the vicinity of the selected X-electrode or the selected Y-electrode, a signal corresponding to a signal from the stylus is not obtained from these electrodes. When the stylus approaches the vicinity of the selected X-electrode or the selected Y-electrode, on the other hand, a signal corresponding to the signal from the stylus is induced in the electrode that the stylus has approached. Thus, the induced signal is supplied to the gain control circuit 22. It can be thereby detected that the stylus is located in the vicinity of the intersection point of the X-electrode and the Y-electrode in which the induced signal is present.

Thus, the position detecting device according to the present disclosure can perform both of touch detection and stylus detection appropriately. Incidentally, for switching between touch detection and stylus detection, various methods such as switching according to an instruction of the user and the like can be used.

[Configuration of Transparent Sensor 12]

Figure 4A:
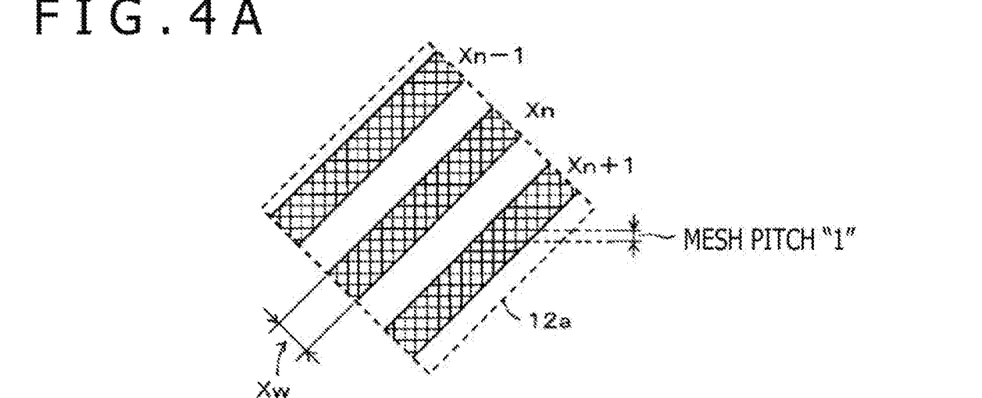
FIGS. 4A, 4B, and 4C are diagrams depicting an example of a configuration of a position detecting sensor according to a first embodiment of the present disclosure.
Figure 4B:
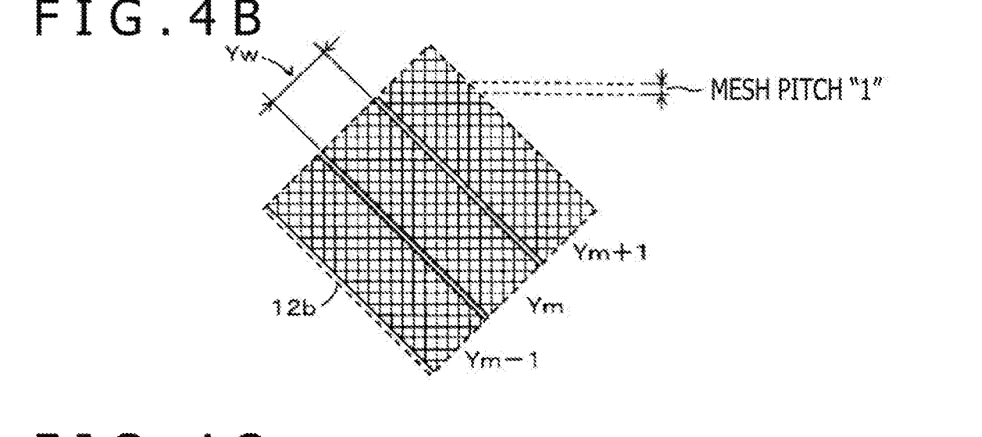
Figure 4C:
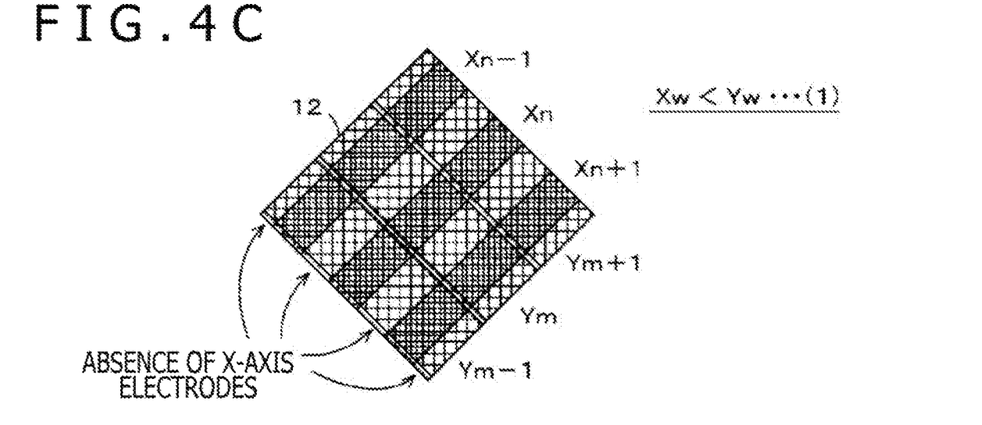

FIGS. 4A to 4C are diagrams of assistance in explaining configuration of the transparent sensor 12. FIG. 4A depicts a part of the insulating layer 12a on which the X-electrodes are arranged (the part of X-electrodes Xn−1, Xn, and Xn+1). In addition, FIG. 4B depicts a part of the insulating layer 12b on which the Y-electrodes are arranged (the part of Y-electrodes Ym−1, Ym, and Ym+1).

FIG. 4C depicts a part of the transparent sensor 12 formed by opposing the insulating layer 12a depicted in FIG. 4A and the insulating layer 12b depicted in FIG. 4B to each other with the insulating layer 12c interposed therebetween. As depicted in FIGS. 4A and 4B, each of the X-electrodes and each of the Y-electrodes in the present embodiment have a predetermined width in an arrangement direction, and are formed such that a net is woven by using metallic thin wires. Each of the X-electrodes and each of the Y-electrodes in the present embodiment are thus in a mesh form (reticulate form) in which a large number of meshes (interstices) are provided.

As is clear from comparison between each of the X-electrodes in FIG. 4A and each of the Y-electrodes in FIG. 4B, a width Xw in the arrangement direction of the X-electrode is narrower than a width Yw in the arrangement direction of the Y-electrode. In the present embodiment, the width Xw of the X-electrode is approximately ½ (half) of the width Yw of the Y-electrode. In addition, as depicted in FIGS. 4A and 4B, as for the fineness of the meshes, the X-electrode and the Y-electrode in the present example have the same fineness (mesh pitch="1"). Incidentally, in FIGS. 4A and 4B, a mesh pitch in a horizontal direction of the figures is the same "1" as in a vertical direction.

As depicted in FIG. 4A, each of the X-electrodes is uniformly disposed on the insulating layer 12a so as to be spaced at a certain interval (interstice). In addition, as depicted in FIG. 4B, each of the Y-electrodes is also uniformly disposed on the insulating layer 12b so as to be spaced at a certain interval (interstice). As is clear from comparison between FIG. 4A and FIG. 4B, the width Xw of the X-electrodes is narrower than the width Yw of the Y-electrodes, and therefore a width between the X-electrodes is wide when the X-electrodes are uniformly arranged on the insulating layer 12a. On the other hand, the width Yw of the Y-electrodes is wider than the width Xw of the X-electrodes, and therefore a width between the Y-electrodes is narrow when the Y-electrodes are uniformly arranged on the insulating layer 12b.

As is also depicted in Expression (1) of FIG. 4C, in the first embodiment, the width Xw of the X-electrodes is narrower than the width Yw of the Y-electrodes. Therefore, as depicted in FIG. 4C, when the transparent sensor 12 is viewed from the insulating layer 12a side on which the X-electrodes are arranged, the Y-electrodes are exposed between the X-electrodes. In addition, the Y-electrodes are also present on the lower side of the X-electrodes excluding parts between the Y-electrodes. The insulating layer 12a side on which the X-electrodes are arranged (on the insulating layer 12a) constitutes an operating surface operated by a finger of a user or the stylus.

Description will be made of stylus detection performed through the thus formed transparent sensor 12. Suppose that an input operation is performed while the stylus is held in contact with the insulating layer 12a (operating surface). In this case, there is no shielding object obstructing the propagation of a signal between the stylus and an X-electrode. Thus, the signal from the stylus directly reaches the X-electrode, and the signal from the stylus is properly received in the X-electrode.

On the other hand, when the pen point of the stylus is located on the X-electrode, the X-electrode is present between the stylus and a Y-electrode. However, because the X-electrodes are formed in a mesh form in the present embodiment, the signal from the stylus passes through the X-electrode, reaches the Y-electrode located directly below the X-electrode, and is received by the Y-electrode. Further, because the width Xw of the X-electrodes is narrower than the width Yw of the Y-electrodes, the width between the X-electrodes is wide, as described above. In parts between the X-electrodes, the signal from the stylus directly reaches the Y-electrode, and is received by the Y-electrode.

Figure 5A:
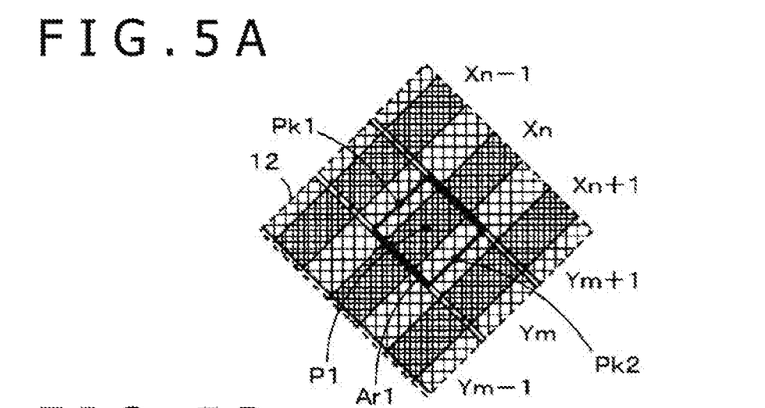
FIGS. 5A, 5B, and 5C are diagrams of assistance in explaining a coupling capacitance at an electrode constituting the position detecting sensor according to the first embodiment of the present disclosure.
Figure 5B:
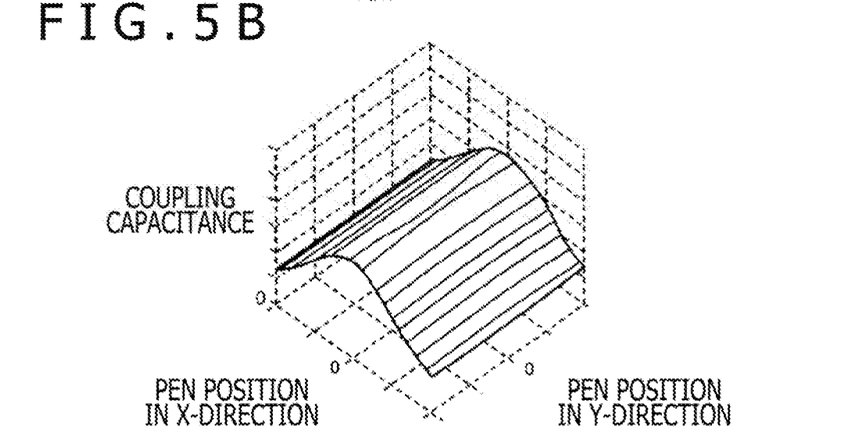
Figure 5C:
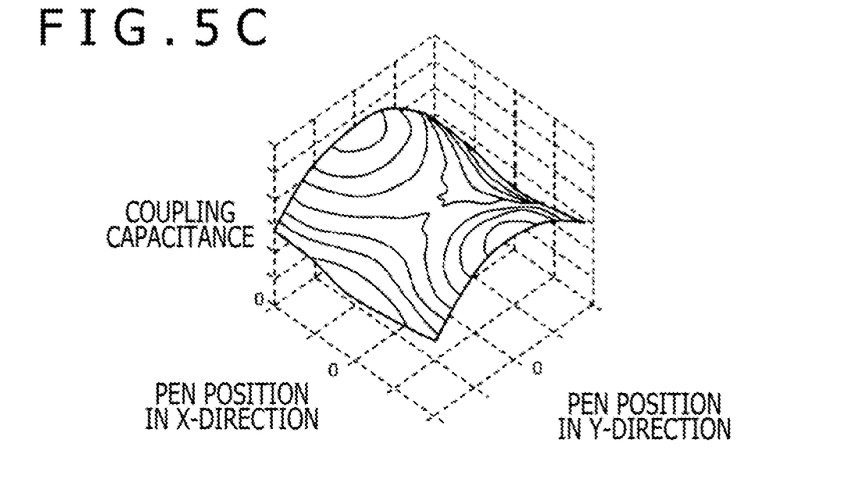

FIGS. 5A to 5C are diagrams of assistance in explaining a coupling capacitance (capacitance) between a stylus and an X-electrode or a Y-electrode in a case where the stylus indicates a position on the operating surface of the transparent sensor 12. As with FIG. 4C, FIG. 5A depicts the transparent sensor 12 formed by laminating the insulating layer 12a on which the X-electrodes are arranged and the insulating layer 12b on which the Y-electrodes are arranged to each other with the insulating layer 12c interposed therebetween. Consideration will be given to a case where a core body of a stylus not depicted is in contact with a position P1 represented by a black dot on the insulating layer 12a on which the X-electrodes of the transparent sensor 12 are arranged (on the operating surface) in FIG. 5A.

FIG. 5B depicts a coupling capacitance between the stylus and the X-electrode Xn in a quadrangular area Ar1 represented by a solid line of FIG. 5A in this case. In FIG. 5B, a vertical axis indicates the coupling capacitance, and axes in directions of intersecting each other at a bottom indicate pen positions in the X-direction and the Y-direction in a case where the contact position P1 of the stylus is set as a reference "0."

There is no shielding object between the stylus and the X-electrode Xn. Therefore, as depicted in FIG. 5B, in the X-electrode Xn directly below the contact position P1 of the stylus, a coupling capacitance is increased in a longitudinal direction of the X-electrode Xn with the contact position P1 as a reference. Because the width Xw of the X-electrodes is narrow, the coupling capacitance is decreased toward both side edges of the X-electrode Xn. However, it is clear that an excellent coupling capacitance is obtained between the stylus and the X-electrode Xn.

That is, as is clear from the characteristic of the coupling capacitance in FIG. 5B, a curve of the characteristic of the coupling capacitance is a similar curve at any position in the longitudinal direction of the X-electrode Xn. Hence, it is clear that a similar characteristic is obtained as the characteristic related to the coupling capacitance at any position in the longitudinal direction of the X-electrode Xn. It is therefore clear that a position detection result with good linearity is obtained in the longitudinal direction of the X-electrode Xn.

FIG. 5C depicts a coupling capacitance between the stylus and the Y-electrode Ym in the quadrangular area Ar1 represented by the solid line of FIG. 5A in a similar case. Also in FIG. 5C, the denotation of each axis is the same as in the case of FIG. 5B.

The X-electrodes do not constitute a shielding object at and in the vicinity of positions Pk1 and Pk2 in parts where the X-electrodes are not present (parts between the X-electrodes), the positions Pk1 and Pk2 being in the vicinity of the contact position P1 of the core body of the stylus in the longitudinal direction of the Y-electrode Ym. Therefore, the signal from the stylus directly reaches the Y-electrode Ym, and the coupling capacitance is increased. In addition, the X-electrode Xn is present directly below the contact position P1 that the core body of the stylus is in contact with. However, because the X-electrode Xn is in a mesh form, the signal from the stylus passes through the X-electrode and reaches the Y-electrode. Hence, also in a part of the Y-electrode Ym which part is directly below the position P1, the signal from the stylus can be received, so that the coupling capacitance is relatively increased.

In this case, in a direction along the Y-electrode Ym, the coupling capacitance between the stylus and the Y-electrode Ym is slightly decreased on the X-electrode Xn, but the coupling capacitance is relatively increased. In other words, in the direction along the Y-electrode Ym, a change occurs in the coupling capacitance, but the degree of the change is relatively small. The linearity of the position detection result is therefore relatively excellent also in the direction along the Y-electrode Ym.

Thus, in the state depicted in FIG. 5A, there is no shielding object between the stylus and the X-electrode Xn, and therefore the coupling capacitance is increased on the X-electrode Xn in the longitudinal direction of the X-electrode Xn (FIG. 5B). It is thereby possible to detect an indicated position in the arrangement direction of the X-electrodes properly. In addition, in the state depicted in FIG. 5A, because the width Xw of the X-electrode is narrower than the width Yw of the Y-electrode, the Y-electrode can directly receive the signal from the stylus in a part in which there is no X-electrode between the X-electrodes, and therefore the coupling capacitance in the part is increased (FIG. 5C). In addition, also in the Y-electrode directly below the X-electrode, the signal from the stylus passes through the X-electrode and reaches the Y-electrode because the X-electrode is in a mesh form, and the coupling capacitance between the stylus and the Y-electrode is relatively increased (FIG. 5C). It is thereby possible to detect also an indicated position in the arrangement direction of the Y-electrodes properly.

Thus, in the case where the transparent sensor 12 according to the present first embodiment is used, the coupling capacitance between the Y-electrode opposed to the X-electrode and the stylus does not greatly change even when the X-electrode is present between the Y-electrode and the stylus. It is thereby possible to perform stylus detection properly. Incidentally, when the stylus is located on the operating surface and between X-electrodes, the signal from the stylus is received by an adjacent X-electrode, and is directly received by the Y-electrode directly below. It is therefore possible to perform stylus detection properly. Thus, the transparent sensor 12 and the position detecting device using the transparent sensor 12 according to the present first embodiment can more improve the linearity of accuracy of detection of a position indicated (coordinates indicated) by the stylus, and thereby enable minute indication input difficult with a finger to be performed more properly.

In addition, in a case of touch input by a finger of a user or the like, the finger of the user has a large area of contact with the operating surface as compared with the pen point of the stylus. Therefore, when the finger touches the operating surface of the transparent sensor 12, an electric field from the Y-electrode supplied with a signal in the vicinity of the finger is absorbed by the finger. Consequently, a signal level induced in the X-electrode intersecting the Y-electrode is decreased, and the intersection point of the Y-electrode supplied with the signal and the X-electrode decreased in signal level can be detected as a touch position touched by the finger. That is, touch input to the transparent sensor 12 can also be detected properly.

Second Embodiment

[Outline of Transparent Sensor and Position Detecting Device]

Description will next be made of a second embodiment of the transparent sensor and the position detecting device. In the case of the transparent sensor 12 according to the foregoing first embodiment, as described with reference to FIG. 5C, the coupling capacitance between the stylus and the Y-electrode slightly changes in the longitudinal direction of the Y-electrode. Accordingly, a transparent sensor according to the present second embodiment makes the characteristic of the coupling capacitance between the stylus and the Y-electrode flat with a smaller change, and thus can more improve the linearity of a result of detection of an indicated position.

A basic configuration of the transparent sensor 12A according to the present second embodiment is similar to that of the transparent sensor 12 according to the first embodiment described with reference to FIG. 1. The basic configuration of the transparent sensor 12A is constituted by an insulating layer 12aA on which X-electrodes are arranged, an insulating layer 12c, and an insulating layer 12bA on which Y-electrodes are arranged. In addition, the position detecting device according to the present second embodiment is configured in a similar manner to the position detecting device described with reference to FIG. 3. However, the position detecting device according to the present second embodiment is configured using the transparent sensor 12A according to the second embodiment in place of the transparent sensor 12 according to the first embodiment.

[Configuration of Transparent Sensor 12A]

Figure 6A:
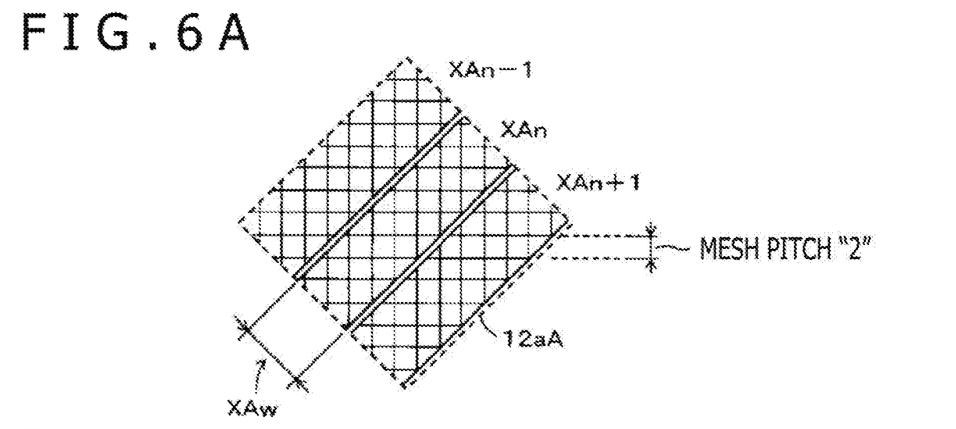
FIGS. 6A, 6B, and 6C are diagrams depicting an example of a configuration of a position detecting sensor according to a second embodiment.
Figure 6B:
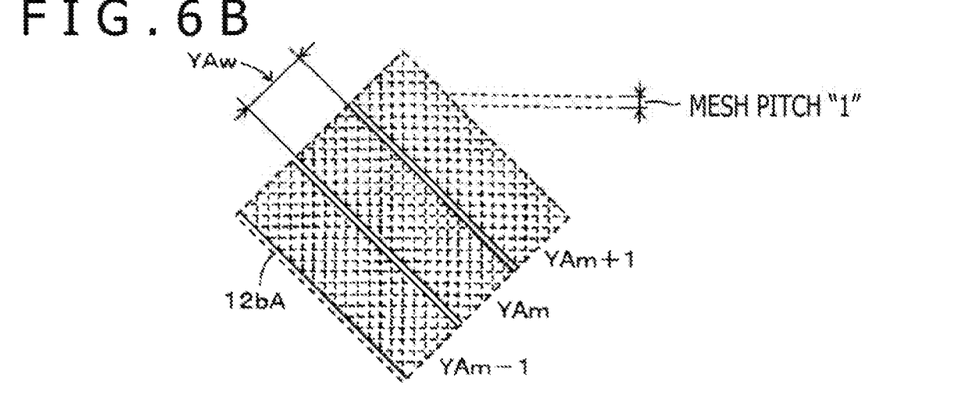

In the present second embodiment, a configuration of the X-electrodes and the Y-electrodes of the transparent sensor 12A is different from that of the transparent sensor 12 according to the first embodiment described with reference to FIGS. 4A to 4C and FIGS. 5A to 5C. FIGS. 6A to 6C are diagrams of assistance in explaining the configuration of the transparent sensor 12A according to the second embodiment. FIG. 6A depicts a part of the insulating layer 12aA on which the X-electrodes are arranged (the part of X-electrodes XAn−1, XAn, and XAn+1). In addition, FIG. 6B depicts a part of the insulating layer 12bA on which the Y-electrodes are arranged (the part of Y-electrodes YAm−1, YAm, and YAm+1).

Figure 6C:
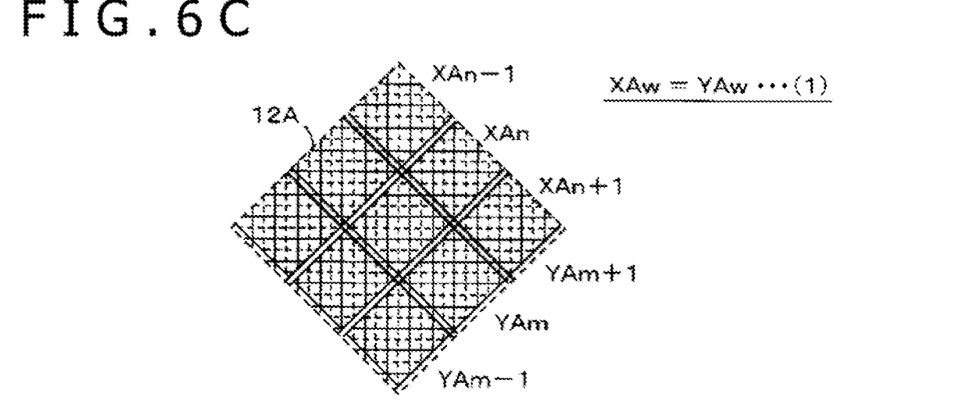

FIG. 6C depicts a part of the transparent sensor 12A according to the second embodiment which transparent sensor is formed by opposing the insulating layer 12aA depicted in FIG. 6A and the insulating layer 12bA depicted in FIG. 6B to each other with the insulating layer 12c interposed therebetween. As depicted in FIGS. 6A and 6B, also in the present second embodiment, each of the X-electrodes and each of the Y-electrodes have a predetermined width in an arrangement direction, and are formed such that a net is woven by using metallic thin wires. Each of the X-electrodes and each of the Y-electrodes are thus in a mesh form (reticulate form) in which a large number of meshes (interstices) are provided.

As is clear from comparison between each of the X-electrodes in FIG. 6A and each of the Y-electrodes in FIG. 6B, the mesh density of the X-electrodes is sparse (coarse), and the mesh density of the Y-electrodes is dense (fine). More specifically, as depicted in FIGS. 6A and 6B, the mesh pitch (intervals between conductors) of the X-electrodes is "2," whereas the mesh pitch of the Y-electrodes is "1." Also in this case, the mesh pitches in a horizontal direction of FIGS. 6A to 6C are the same as the mesh pitches in a vertical direction, and are "2" for the X-electrodes and "1" for the Y-electrodes. Hence, in the present example, the area of meshes (interstices) of the X-electrodes is four times the area of meshes (interstices) of the Y-electrodes. In the present second embodiment, the width XAw of the X-electrodes and the width YAw of the Y-electrodes are equal to each other.

As depicted in FIG. 6A, each of the X-electrodes is uniformly disposed on the insulating layer 12aA so as to be spaced at a certain interval (interstice). In addition, as depicted in FIG. 6B, each of the Y-electrodes is also uniformly disposed on the insulating layer 12bA so as to be spaced at a certain interval (interstice).

As is also depicted in Expression (1) of FIG. 6C, in the case of the transparent sensor 12A according to the present second embodiment, the width XAw of the X-electrodes and the width YAw of the Y-electrodes are equal to each other. Therefore, as depicted in FIG. 6C, the Y-electrodes are covered by the X-electrodes. However, when the transparent sensor 12A is viewed from the insulating layer 12aA side on which the X-electrodes are arranged, many parts of the Y-electrodes located on the lower side (back side) of the X-electrodes are exposed from the meshes of the X-electrodes because the mesh density of the X-electrodes is sparser than the mesh density of the Y-electrodes. Consequently, when the core body of the stylus is located on the insulating layer 12aA (on the operating surface), the signal from the stylus is received by an X-electrode, and the signal from the stylus passes through the X-electrode and reaches also a Y-electrode located on the lower side of the X-electrode, and is received also by the Y-electrode.

Figure 7A:
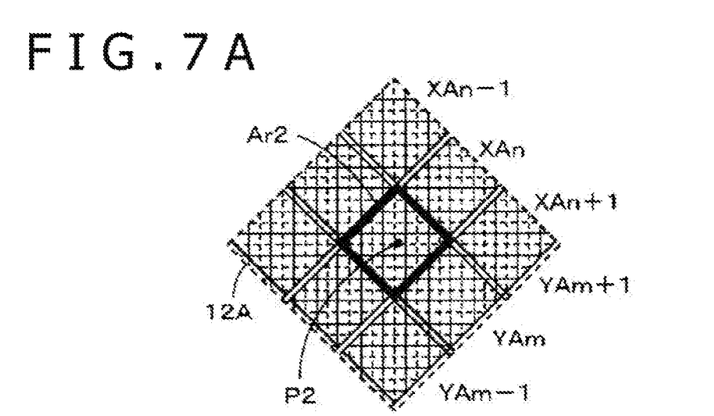
FIGS. 7A, 7B, and 7C are diagrams of assistance in explaining a coupling capacitance at an electrode constituting the position detecting sensor according to the second embodiment.
Figure 7B:
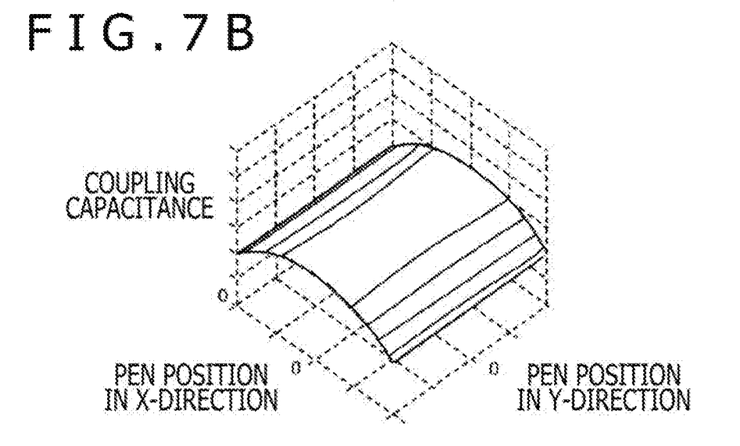
Figure 7C:
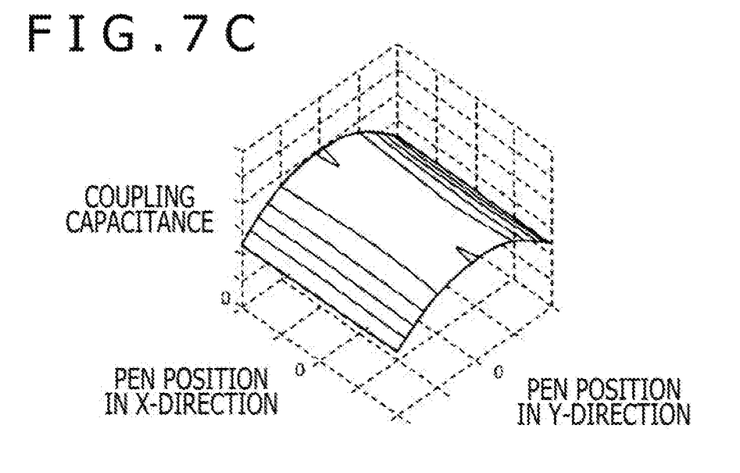

FIGS. 7A to 7C are diagrams of assistance in explaining a coupling capacitance (capacitance) between a stylus and an X-electrode or a Y-electrode in a case where the stylus indicates a position on the operating surface of the transparent sensor 12A. As with FIG. 6C, FIG. 7A depicts the transparent sensor 12A formed by lamination. Consideration will be given to a case where a core body of a stylus not depicted is in contact with a position P2 represented by a black dot on the insulating layer 12aA on which the X-electrodes of the transparent sensor 12A are arranged (on the operating surface) in FIG. 7A.

FIG. 7B depicts a coupling capacitance between the stylus and the X-electrode XAn in a quadrangular area Ar2 represented by a solid line of FIG. 7A in this case. Also in FIG. 7B, the denotation of each axis is the same as in the case of FIGS. 5B and 5C.

There is no shielding object between the stylus and the X-electrode XAn. However, the mesh density of the X-electrodes is sparser than that of the Y-electrodes, and is twice coarser than that of the X-electrodes in the first embodiment. Therefore, as depicted in FIG. 7B, as compared with the coupling capacitance of the X-electrode Xn of the transparent sensor 12 according to the first embodiment, the coupling capacitance in the longitudinal direction with respect to the contact position P2 in the X-electrode XAn of the transparent sensor 12A according to the second embodiment is slightly decreased.

However, as compared with the width Xw of the X-electrodes of the transparent sensor 12 according to the first embodiment, the width XAw of the X-electrodes of the transparent sensor 12A according to the second embodiment is wide, and therefore the coupling capacitance is high over a wider range. As is clear from the characteristic of the coupling capacitance in FIG. 7B, a curve of the characteristic of the coupling capacitance is a similar curve at any position in the longitudinal direction of the X-electrode XAn. Hence, it is clear that a similar characteristic is obtained as the characteristic related to the coupling capacitance at any position in the longitudinal direction of the X-electrode XAn. It is therefore clear that a position detection result with good linearity is obtained in the longitudinal direction of the X-electrode XAn.

FIG. 7C depicts a coupling capacitance between the stylus and the Y-electrode Ym in the quadrangular area Ar2 represented by the solid line of FIG. 7A in a similar case. Also in FIG. 7C, the denotation of each axis is the same as in FIG. 7B.

In the transparent sensor 12A according to the present second embodiment, as described above, the mesh density of the X-electrodes located on the upper side (operating surface side) is sparse, and the mesh density of the Y-electrodes located on the lower side (back side) is dense. Therefore, more of the signal from the stylus passes through the X-electrode XAn and reaches the Y-electrode YAm, so that the coupling capacitance between the stylus and the Y-electrode YAm is high over a range wide, as depicted in FIG. 7C.

That is, in a direction along the Y-electrode YAm, because of the sparse mesh density of the X-electrode XAn, the coupling capacitance between the stylus and the Y-electrode YAm does not greatly change at any position also on the X-electrode XAn. Hence, as is clear from the characteristic of the coupling capacitance in FIG. 7C, a curve of the characteristic of the coupling capacitance is a similar curve at any position in the longitudinal direction of the Y-electrode YAm. Therefore, the linearity of the position detection result is very excellent also in the direction along the Y-electrode YAm.

Thus, in the state depicted in FIG. 7A, the mesh density of the X-electrode is sparse. However, there is no shielding object between the stylus and the X-electrode Xn, and the X-electrodes have a wide width. The coupling capacitance between the X-electrode Xn as a whole and the stylus is therefore high (FIG. 7B). It is therefore possible to detect an indicated position in the arrangement direction of the X-electrodes properly. In addition, because the mesh density of the X-electrode is sparse, and the mesh density of the Y-electrode is dense, more of the signal from the stylus passes through the X-electrode, and is received by the Y-electrode, so that the coupling capacitance between the stylus and the Y-electrode is also high (FIG. 7C). It is thereby possible to detect an indicated position in the arrangement direction of the Y-electrodes properly.

Furthermore, as is clear from FIGS. 7B and 7C, the coupling capacitance between the stylus and the X-electrode XAn and the coupling capacitance between the stylus and the Y-electrode YAm are both flat (uniform) over a wide range, and the coupling capacitances themselves are high. That is, in the longitudinal direction of the X-electrode XAn, the characteristic of the coupling capacitance is the same at any position. Similarly, also in the longitudinal direction of the Y-electrode YAm, the characteristic of the coupling capacitance is the same at any position. That is, it is clear that the linearity of the position detection result is greatly improved.

Thus, in the case where the transparent sensor 12A according to the present second embodiment is used, the coupling capacitance between the Y-electrode opposed to the X-electrode and the stylus is not lowered even when the X-electrode is present between the Y-electrode and the stylus, and the signal from the stylus is sufficiently induced in the Y-electrode. It is thereby possible to perform stylus detection properly. In addition, the coupling capacitance between the stylus and the X-electrode and the coupling capacitance between the stylus and the Y-electrode are both flat (uniform) over a wide range, and the coupling capacitances themselves are high. Therefore, the transparent sensor 12A according to the present second embodiment and the position detecting device using the transparent sensor 12A can further improve the linearity of accuracy of detection of a position indicated (coordinates indicated) by the stylus, and thereby enable minute indication input by the stylus to be performed more properly.

Incidentally, in a case of touch input by a finger of a user or the like, the finger of the user has a large area of contact with the operating surface as compared with the pen point of the stylus. Therefore, when the finger touches the operating surface of the transparent sensor 12A, an electric field from the Y-electrode supplied with a signal passes through the X-electrode having a sparse mesh density, and is absorbed by the finger. Consequently, a signal level induced in the X-electrode intersecting the Y-electrode is decreased, and the intersection point of the Y-electrode supplied with the signal and the X-electrode decreased in signal level can be detected as a touch position touched by the finger. That is, touch input to the transparent sensor 12A can also be detected properly.

Third Embodiment

[Outline of Transparent Sensor and Position Detecting Device]

Description will next be made of a third embodiment of the transparent sensor and the position detecting device. A basic configuration of the transparent sensor 12B according to the present third embodiment is similar to that of the transparent sensor 12 according to the first embodiment described with reference to FIG. 1. The basic configuration of the transparent sensor 12B is constituted by an insulating layer 12aB on which X-electrodes are arranged in an X-direction (horizontal direction), an insulating layer 12c, and an insulating layer 12bB on which Y-electrodes are arranged in a Y-direction (vertical direction). In addition, the position detecting device according to the present third embodiment is configured in a similar manner to the position detecting device described with reference to FIG. 3. However, the position detecting device according to the present third embodiment is configured using the transparent sensor 12B according to the present third embodiment in place of the transparent sensor 12 according to the first embodiment.

[Configuration of Transparent Sensor 12B]

In the third embodiment, a configuration of the X-electrodes and the Y-electrodes of the transparent sensor 12B is different from that of the transparent sensor 12 according to the first embodiment described with reference to FIGS. 4A to 4C and FIGS. 5A to 5C, and is also different from that of the transparent sensor 12A according to the second embodiment described with reference to FIGS. 6A to 6C and FIGS. 7A to 7C. The transparent sensor 12B according to the present third embodiment combines features of the transparent sensor 12 according to the first embodiment and the transparent sensor 12A according to the second embodiment. That is, in the transparent sensor 12B according to the present third embodiment, the width of the X-electrodes is narrower than the width of the Y-electrodes, and the mesh density of the X-electrodes is sparser than the mesh density of the Y-electrodes.

Figure 8A:
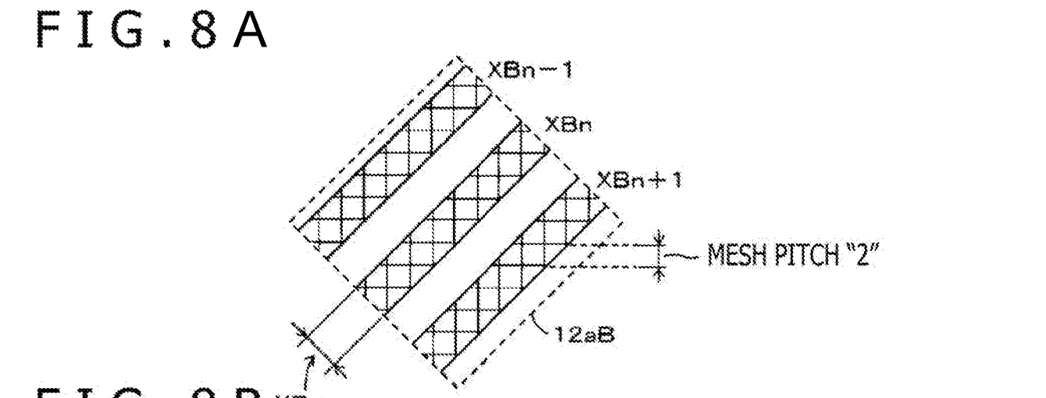
FIGS. 8A, 8B, and 8C are diagrams depicting an example of a configuration of a position detecting sensor according to a third embodiment of the present disclosure.
Figure 8B:
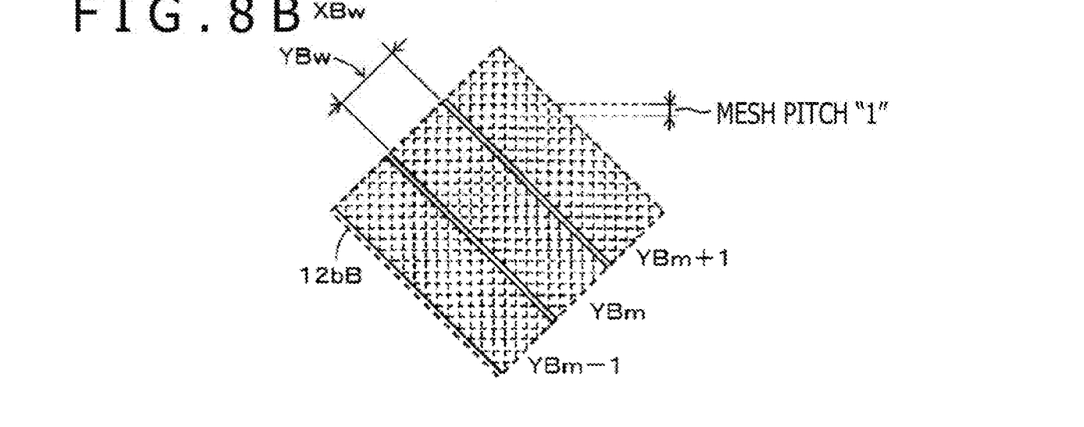
Figure 8C:
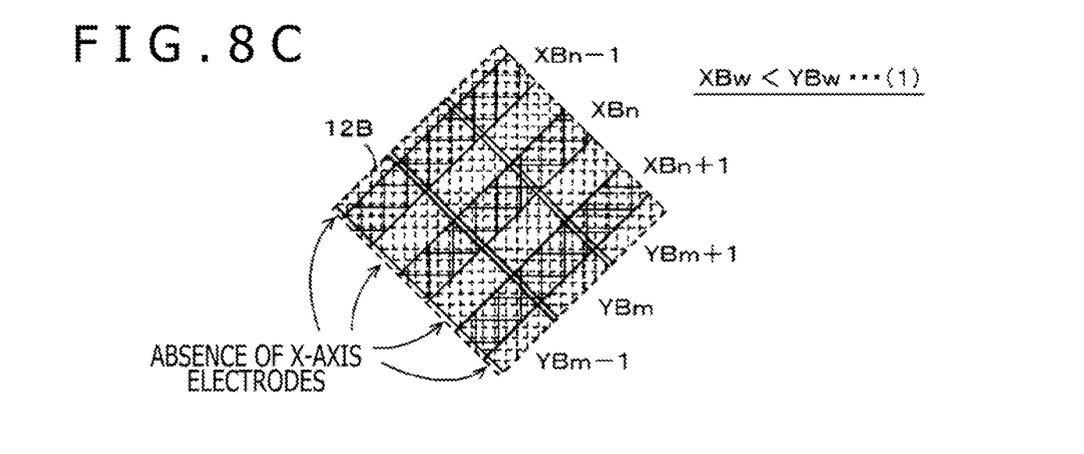

FIGS. 8A to 8C are diagrams of assistance in explaining the configuration of the transparent sensor 12B according to the present third embodiment. FIG. 8A depicts a part of the insulating layer 12aB on which the X-electrodes are arranged (the part of X-electrodes XBn−1, XBn, and XBn+1). In addition, FIG. 8B depicts a part of the insulating layer 12bB on which the Y-electrodes are arranged (the part of Y-electrodes YBm−1, YBm, and YBm+1).

FIG. 8C depicts a part of the transparent sensor 12B according to the present third embodiment which transparent sensor is formed by opposing the insulating layer 12aB depicted in FIG. 8A and the insulating layer 12bB depicted in FIG. 8B to each other with the insulating layer 12c interposed therebetween. As depicted in FIGS. 8A and 8B, also in the third embodiment, each of the X-electrodes and each of the Y-electrodes have a predetermined width in an arrangement direction, and are formed such that a net is woven by using metallic thin wires. Each of the X-electrodes and each of the Y-electrodes are thus in a mesh form (reticulate form) in which a large number of meshes (interstices) are provided.

As is clear from comparison between each of the X-electrodes in FIG. 8A and each of the Y-electrodes in FIG. 8B, a width XBw in the arrangement direction of the X-electrode is narrower than a width YBw in the arrangement direction of the Y-electrode. In the third embodiment, the width XBw of the X-electrode is approximately ½ (half) of the width YBw of the Y-electrode. In addition, the mesh density of the X-electrode is sparse (coarse), and the mesh density of the Y-electrode is dense (fine). In the third embodiment, the mesh pitch (intervals between conductors) of the X-electrode is "2," whereas the mesh pitch of the Y-electrode is "1." Also in this case, the mesh pitches in a horizontal direction of FIGS. 8A to 8C are the same as the mesh pitches in a vertical direction, and are "2" for the X-electrodes and "1" for the Y-electrodes.

As depicted in FIG. 8A, each of the X-electrodes is uniformly disposed on the insulating layer 12aB so as to be spaced at a certain interval (interstice). Meanwhile, as depicted in FIG. 8B, each of the Y-electrodes is also uniformly disposed on the insulating layer 12bB so as to be spaced at a certain interval (interstice). As is clear from comparison between FIG. 8A and FIG. 8B, the width XBw of the X-electrodes is narrower than the width YBw of the Y-electrodes, and therefore a width between the X-electrodes is wide when the X-electrodes are uniformly arranged on the insulating layer 12a. On the other hand, the width Yw of the Y-electrodes is wider than the width Xw of the X-electrodes, and therefore a width between the Y-electrodes is narrow when the Y-electrodes are uniformly arranged on the insulating layer 12b.

As depicted in Expression (1) of FIG. 8C, in the third embodiment, the width XBw of the X-electrodes is narrower than the width YBw of the Y-electrodes. Therefore, as depicted in FIG. 8C, when the transparent sensor 12B is viewed from the insulating layer 12aB side on which the X-electrodes are arranged, the Y-electrodes are exposed from the interstices between the X-electrodes. In addition, because the mesh density of the X-electrodes is sparser than the mesh density of the Y-electrodes, many parts of the Y-electrodes located on the lower side (back side) of the X-electrodes are exposed from the meshes of the X-electrodes. The insulating layer 12a side on which the X-electrodes are arranged (on the insulating layer 12a) constitutes an operating surface operated by a finger of a user or the stylus.

Description will be made of stylus detection performed through the thus formed transparent sensor 12B. Suppose that an input operation is performed while the stylus is held in contact with the operating surface as a surface on the insulating layer 12aB side. In this case, there is no shielding object obstructing the propagation of a signal between the stylus and an X-electrode. Thus, the signal from the stylus directly reaches the X-electrode, and the signal from the stylus is properly received in the X-electrode.

On the other hand, when the pen point of the stylus is located on the X-electrode, the X-electrode is present between the stylus and a Y-electrode. However, in the present embodiment, the X-electrodes are formed in a mesh form, and the mesh pitch of the X-electrodes is sparser than the mesh pitch of the Y-electrodes. Therefore, more of the signal from the stylus passes through the X-electrode, reaches the Y-electrode located directly below the X-electrode, and is received by the Y-electrode. Further, because the width XBw of the X-electrodes is narrower than the width YBw of the Y-electrodes, a relatively wide interstice is provided between the X-electrodes. In this interstice part, the signal from the stylus directly reaches the Y-electrode, and is received by the Y-electrode.

Consequently, when the core body of the stylus is located on the insulating layer 12aB (on the operating surface), the signal from the stylus is received by the X-electrode, and the signal from the stylus passes through the X-electrode and reaches also the Y-electrode located on the lower side of the X-electrode, and is received also by the Y-electrode. Hence, stylus input can be detected properly.

Thus, in the case where the transparent sensor 12B according to the present third embodiment is used, the coupling capacitance between the Y-electrode opposed to the X-electrode and the stylus is not lowered even when the X-electrode is present between the Y-electrode and the stylus, and the signal from the stylus is sufficiently induced in the Y-electrode. It is thereby possible to perform stylus detection properly. In addition, when the stylus is located on the operating surface and between X-electrodes, the signal from the stylus is received by an adjacent X-electrode, and is directly received by the Y-electrode directly below. It is therefore possible to perform stylus detection properly. Hence, the transparent sensor 12B and the position detecting device using the transparent sensor 12B according to the present third embodiment can more improve the linearity of accuracy of detection of a position indicated (coordinates indicated) by the stylus, and thereby enable minute indication input difficult with a finger to be performed more properly.

In addition, in a case of touch input by a finger of a user or the like, the finger of the user has a large area of contact with the operating surface as compared with the pen point of the stylus. Therefore, when the finger touches the operating surface of the transparent sensor 12, an electric field from the Y-electrode supplied with a signal in the vicinity of the finger is absorbed by the finger. Consequently, a signal level induced in the X-electrode intersecting the Y-electrode is decreased, and the intersection point of the Y-electrode supplied with the signal and the X-electrode decreased in signal level can be detected as a touch position touched by the finger. That is, touch input to the transparent sensor 12 can also be detected properly.

[Effect of Embodiment]

The transparent sensors 12, 12A, and 12B according to the foregoing embodiments can maintain a sufficient coupling capacitance between an electrode close to the operating surface with which the stylus (electronic pen) is in contact and the stylus, and secure a sufficient coupling capacitance between an electrode located on the back side as viewed from the operating surface and the stylus. The detection accuracy of stylus detection (for indication input by the stylus) can be thereby improved. That is, the linearity of accuracy of detection of a position indicated (coordinates indicated) by the stylus can be improved more, and minute indication input difficult with a finger is thereby enabled to be performed more properly.

In the case of the transparent sensor 12A according to the second embodiment, in particular, the characteristics of both of the coupling capacitance between the stylus and the X-electrode and the coupling capacitance between the stylus and the Y-electrode can be made flat over a wide range. Consequently, the linearity of accuracy of detection of a position indicated (coordinates indicated) by the stylus can be further improved, and minute indication input difficult with a finger is thereby enabled to be performed further properly.

[Modifications]

The position detecting sensors 12, 12A, and 12B described in the foregoing first to third embodiments are merely examples, and the present disclosure is not limited to the foregoing embodiments but is susceptible of various modifications. For example, while description has been made supposing that the width Xw of the X-electrodes is ½ (half) of the width Yw of the Y-electrodes in the transparent sensor 12 according to the foregoing first embodiment, the width Xw of the X-electrodes is not limited to this. In the first embodiment, the width Xw of the X-electrodes can be set to an appropriate width as long as the width Xw of the X-electrodes is narrower than the width Yw of the Y-electrodes. It suffices to set the width Xw of the X-electrodes to an optimum width according to a result of simulation or actual measurement or the like.

In addition, while description has been made supposing that the mesh pitch of the X-electrodes is "2" and the mesh pitch of the Y-electrodes is "1" in the transparent sensor 12A according to the foregoing second embodiment, the mesh pitches are not limited to this. In the second embodiment, it suffices for the mesh pitch of the X-electrodes to be larger than the mesh pitch of the Y-electrodes. In other words, the mesh pitches (mesh densities) of the X-electrodes and the Y-electrodes can be set to be appropriate mesh pitches (mesh densities) as long as the mesh density of the X-electrodes is sparser (coarser) than the mesh density of the Y-electrodes. Incidentally, it suffices to set the mesh pitches (mesh densities) of the X-electrodes and the Y-electrodes to optimum mesh pitches (mesh densities) according to a result of simulation or actual measurement or the like. Hence, the mesh pitches in the horizontal direction may be different from the mesh pitches in the vertical direction.

In addition, also in the transparent sensor 12B according to the foregoing third embodiment, the width Xw of the X-electrodes can be set to an appropriate width as long as the width Xw of the X-electrodes is narrower than the width Yw of the Y-electrodes. In addition, also in the transparent sensor 12B according to the present third embodiment, the mesh pitch of the X-electrodes can be set to be an appropriate mesh pitch as long as the mesh pitch of the X-electrodes is larger than the mesh pitch of the Y-electrodes, that is, as long as the mesh density of the X-electrodes is sparser (coarser) than the mesh density of the Y-electrodes.

It is also possible to make the width of the X-electrodes wider than the width of the Y-electrodes, and make the mesh density of the X-electrodes sparser than the mesh density of the Y-electrodes. Also in this case, it suffices to make both of the coupling capacitance between the stylus and the X-electrode and the coupling capacitance between the stylus and the Y-electrode sufficient capacitances, and make the characteristics of the coupling capacitances flat as described with reference to FIGS. 7A to 7C, for example.

In addition, the pattern of the metallic mesh sensor itself is not limited to the repetitive pattern of a square lattice rotated by 45 degrees, for example, as depicted in the position detecting sensors 12, 12A, and 12B described above. The shape of the meshes (interstices) may be a circular shape or a semi-circular shape, or may be various polygonal shapes with three angles or more. Of course, the shape of the meshes may be other shapes, and are not limited to the repetition of a same shape. Also in this case, a mode in which the mesh density of the X-electrodes is sparse (coarse) and the mesh density of the Y-electrodes is dense (fine) can be adopted by setting an average value of the area of the meshes of the X-electrodes larger than that of the Y-electrodes.

In addition, in the foregoing embodiments, description has been made supposing that the insulating layers 12a, 12aA, and 12aB on which the X-electrodes are arranged are located on the operating surface side, and the insulating layers 12b, 12bA, and 12bB on which the Y-electrodes are arranged are located on the back side as viewed from the operating surface side. However, there is no limitation to this. The insulating layers 12b, 12bA, and 12bB on which the Y-electrodes are arranged may be located on the operating surface side, and the insulating layers 12a, 12aA, and 12aB on which the X-electrodes are arranged may be located on the back side as viewed from the operating surface side.

Incidentally, in this case, it suffices to supply a signal for touch detection to the X-electrodes located on the back side as viewed from the operating surface side, and detect a signal while changing the Y-electrodes. In addition, when touch detection is possible, a signal for touch detection may be supplied to the electrodes located on the operating surface side, and a signal may be detected while changing the electrodes on the back side.

In addition, in the foregoing embodiment, description has been made of the capability to perform also touch detection that detects a position indicated by an indicator such as a finger of a user or the like. The indicator in this case includes not only a finger of a user but also an object referred to as a so-called passive pen, for example, which includes a tip (pen tip) of a conductive rubber and a conductive casing to which the tip is attached and in which conduction with the user occurs when the user uses the passive pen while holding the passive pen with a hand. In addition, an electronic pen that has a thin pen tip, includes an electronic circuit, and is capable of absorbing an electric field from an electrode supplied with a signal as with a finger of a user electrically can also be used as an indicator for touch detection. That is, in cases where an indicator such as a finger of a user or the like is referred to, the indicator includes various indicators functioning similarly to a finger of a user.

Hence, the position detecting sensors and the position detecting devices according to the foregoing embodiments can detect a position indicated by a passive type indicator such as a finger of a user, a passive pen, or the like that does not send out a signal. In addition, the position detecting sensors and the position detecting devices according to the foregoing embodiments can detect a position indicated by an active type indicator such as an active electrostatic coupling type (AES type) stylus or the like that sends out a signal. Therefore, the position detecting sensors and the position detecting devices are capable of one or both of the detection of a position indicated by a passive type indicator and the detection of a position indicated by an active type indicator.

In addition, various systems can also be realized which include the position detecting device according to the present disclosure using the position detecting sensor according to the present disclosure and perform various kinds of information processing. The systems in this case include various information processing systems that have an information processing function (information processing device) and perform various kinds of processing on the basis of an indicated position detected by the position detecting device. Specifically, the systems include a tablet personal computer (PC), a notebook PC, a desktop PC, various other information processing devices, and the like.

It is to be noted that the embodiment of the present disclosure is not limited to the foregoing embodiment, and that various changes can be made without departing from the spirit of the present disclosure.

What is claimed is:

1. A position detecting sensor for use with an active stylus, the position detecting sensor comprising:
a plurality of first electrodes arranged in a first direction; and
a plurality of second electrodes arranged in a second direction intersecting the first direction,
wherein the plurality of first electrodes and the plurality of second electrodes are both formed in a mesh form,
wherein the plurality of first electrodes is located closer to an operating surface with which the active stylus comes into contact than the plurality of second electrodes, and
wherein a width of each of the plurality of first electrodes located closer to the operating surface with which the active stylus comes into contact than the plurality of second electrodes in an arrangement direction of the plurality of first electrodes is narrower than a width of each of the plurality of second electrodes in an arrangement direction of the plurality of second electrodes, and
wherein a signal transmitted from the active stylus and received by one of the plurality of second electrodes is not shielded by the plurality of first electrodes when a core body of the active stylus is located on the operating surface between two adjacent ones of the plurality of first electrodes.

2. The position detecting sensor according to claim 1, wherein:
the first electrodes are spaced at a first interval in the first direction and the second electrodes are spaced at a second interval in the second direction, and
the first interval in the first direction is greater than the second interval in the second direction.

3. The position detecting sensor according to claim 1, wherein:
the mesh density of each of the plurality of first electrodes is equal to the mesh density of each of the plurality of second electrodes.

4. The position detecting sensor according to claim 1, wherein:
the mesh density of each of the plurality of first electrodes is sparser than the mesh density of each of the plurality of second electrodes.

5. The position detecting sensor according to claim 1, wherein:
the mesh density of each of the plurality of first electrodes is sparser than the mesh density of the plurality of second electrodes.

6. The position detecting sensor according to claim 1, wherein:
the position detecting sensor is configured to detect: (i) a position indicated by a passive type of indicator that does not transmit a signal to the position detecting sensor, and (ii) a position indicated by the active stylus that transmits the signal to the position detecting sensor.

7. A position detecting device for use with an active stylus, the position detecting device comprising:
a position detecting sensor that includes a plurality of first electrodes arranged in a first direction and a plurality of second electrodes arranged in a second direction intersecting the first direction,
wherein the plurality of first electrodes and the plurality of second electrodes are both formed in a mesh form,
wherein the plurality of first electrodes is located closer to an operating surface with which the active stylus comes into contact than the plurality of second electrodes,
wherein a width of each of the plurality of first electrodes located closer to the operating surface with which the active stylus comes into contact than the plurality of second electrodes in an arrangement direction of the plurality of first electrodes is narrower than a width of each of the plurality of second electrodes in an arrangement direction of the plurality of second electrodes, and
wherein a signal transmitted from the active stylus and received by one of the plurality of second electrodes is not shielded by the plurality of first electrodes when a core body of the active stylus is located on the operating surface between two adjacent ones of the plurality of first electrodes; and and an indicated position detecting circuit which, in operation, detects a position indicated by the active stylus by sequentially receiving a signal supplied from each of the plurality of first electrodes and each of the plurality of second electrodes, and detects one of the plurality of first electrodes and the plurality of second electrodes in which a signal is induced in response to the signal transmitted from the active stylus.

8. The position detecting device according to claim 7, wherein:
the first electrodes are spaced at a first interval in the first direction and the second electrodes are spaced at a second interval in the second direction, and
the first interval in the first direction is greater than the second interval in the second direction.

9. The position detecting device according to claim 7, wherein:
the mesh density of each of the plurality of first electrodes is equal to the mesh density of each of the plurality of second electrodes.

10. The position detecting device according to claim 7, wherein:
the mesh density of each of the plurality of first electrodes is sparser than the mesh density of each of the plurality of second electrodes.

11. The position detecting device according to claim 7, wherein:
the mesh density of each of the plurality of first electrodes is sparser than the mesh density the plurality of second electrodes.

12. The position detecting device according to claim 7, further comprising:
a driving signal supply circuit which, in operation, sequentially supplies a driving signal to each of the plurality of first electrodes;
a signal level detecting circuit which, in operation, sequentially receives a signal from each of the plurality of second electrodes, and detects a signal level of the received signal induced by the driving signal supplied to each of the plurality of first electrodes; and
a touch position detecting circuit which, in operation, detects a touch position of a passive indicator based on one of the plurality of first electrodes supplied with the driving signal and one of the plurality of second electrodes in which the signal level detected by the signal level detecting circuit is decreased.

13. An information processing system for use with an active stylus, the information processing system comprising:
a position detecting sensor that includes a plurality of first electrodes arranged in a first direction and a plurality of second electrodes arranged in a second direction intersecting the first direction,
wherein the plurality of first electrodes and the plurality of second electrodes are both formed in a mesh form,
wherein the plurality of first electrodes is located closer to an operating surface with which the active stylus comes into contact than the plurality of second electrodes,
wherein a width of each of the plurality of first electrodes located closer to the operating surface with which the active stylus comes into contact than the plurality of second electrodes in an arrangement direction of the plurality of first electrodes is narrower than a width of each of the plurality of second electrodes in an arrangement direction of the plurality of second electrodes, and
wherein a signal transmitted from the active stylus and received by one of the plurality of second electrodes is not shielded by the plurality of first electrodes when a core body of the active stylus is located on the operating surface between two adjacent ones of the plurality of first electrodes;
an indicated position detecting circuit which, in operation, detects a position indicated by the active stylus by sequentially receiving a signal supplied from each of the plurality of first electrodes and each of the plurality of second electrodes, and detects one of the plurality of first electrodes and the plurality of second electrodes in which a signal is induced in response to the signal transmitted from the active stylus; and
a processor which, in operation, performs processing according to a detection result of the indicated position detecting circuit.

14. The information processing system according to claim 13, wherein:
the first electrodes are spaced at a first interval in the first direction and the plurality of second electrodes,
the first interval in the first direction is greater than the second interval in the second direction.

15. The information processing system according to claim 13, wherein:
the mesh density of each of the plurality of first electrodes is equal to the mesh density of each of the plurality of second electrodes.

16. The information processing system according to claim 13, wherein:
the mesh density of each of the plurality of first electrodes is sparser than the mesh density of each of the plurality of second electrodes.

17. The information processing system according to claim 13, wherein:
the mesh density of each of the plurality of first electrodes is sparser than the mesh density of the plurality of second electrodes.

18. The information processing system according to claim 13, further comprising:
a driving signal supply circuit which, in operation, sequentially supplies a driving signal to each of the plurality of first electrodes;
a signal level detecting circuit which, in operation, sequentially receives a signal from each of the plurality of second electrodes, and detects a signal level of the received signal induced by the driving signal supplied to each of the plurality of first electrodes; and
a touch position detecting circuit which, in operation, detects a touch position of a passive indicator based on one of the plurality of first electrodes supplied with the driving signal and one of the plurality of second electrodes in which the signal level detected by the signal level detecting circuit is decreased.

* * * * *